United States Patent
Roth et al.

(10) Patent No.: US 10,542,005 B2
(45) Date of Patent: *Jan. 21, 2020

(54) CONNECTION CONTROL FOR VIRTUALIZED ENVIRONMENTS

(71) Applicant: Amazon Technologies, Inc., Reno, NV (US)

(72) Inventors: Gregory Branchek Roth, Seattle, WA (US); Andrew Paul Mikulski, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/289,267

(22) Filed: Feb. 28, 2019

(65) Prior Publication Data

US 2019/0199726 A1      Jun. 27, 2019

Related U.S. Application Data

(63) Continuation of application No. 14/673,371, filed on Mar. 30, 2015, now Pat. No. 10,250,603.

(51) Int. Cl.
H04L 29/06          (2006.01)

(52) U.S. Cl.
CPC ............... *H04L 63/10* (2013.01); *H04L 63/20* (2013.01)

(58) Field of Classification Search
None
See application file for complete search history.

(56) References Cited

U.S. PATENT DOCUMENTS

| | | |
|---|---|---|
| 8,601,583 B1 | 12/2013 | Kumar |
| 8,769,531 B2 | 7/2014 | Anderson |
| 8,819,832 B2 | 8/2014 | Li |
| 8,850,512 B2 | 9/2014 | Price |
| 2012/0240182 A1 | 9/2012 | Narayanaswamy |

OTHER PUBLICATIONS

U.S. Patent and Trademark Office, Non-Final Office Action issued in U.S. Appl. No. 14/673,371, dated May 25, 2016.
U.S. Patent and Trademark Office, Final Office Action issued in U.S. Appl. No. 14/673,371, dated Nov. 17, 2016.
U.S. Patent and Trademark Office, Non-Final Office Action issued in U.S. Appl. No. 14/673,371, dated Sep. 26, 2017.
U.S. Patent and Trademark Office, Final Office Action issued in U.S. Appl. No. 14/673,371, dated May 1, 2018.
U.S. Patent and Trademark Office, Notice of Allowance issued in U.S. Appl. No. 14/673,371, dated Nov. 28, 2018.

*Primary Examiner* — Kambiz Zand
*Assistant Examiner* — Thanh H Le
(74) *Attorney, Agent, or Firm* — Hogan Lovells US LLP

(57) ABSTRACT

The launching of new software code, virtual machines, and other such instances can undergo one or more scans before being fully available in an electronic environment. One or more policies may apply to such a launch, which can cause the launch to first be performed under a first network configuration, wherein the instance may not be granted access to resources other than scanning infrastructure. After one or more scans are performed, the results can be compared against the policies and, if the results pass, the instance can be caused to operate in a second network configuration, whether launching a new instance in a production environment, altering the configuration of the network, or other such tasks. The policies can be set by a provider of the relevant resources, an administrator of one or more affected resources, an administrator of the instance, or another appropriate party.

20 Claims, 6 Drawing Sheets

CONNECTION CONTROL FOR VIRTUALIZED ENVIRONMENTS

CROSS REFERENCE TO RELATED APPLICATIONS

This application is a continuation of U.S. application Ser. No. 14/673,371, filed Mar. 30, 2015, entitled "CONNECTION CONTROL FOR VIRTUALIZED ENVIRONMENTS," which is incorporated herein by reference in its entirety for all purposes.

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A customer typically will rent, lease, or otherwise pay for access to resources through the cloud, such that the customer does not have to purchase and maintain the hardware and/or software to provide access to these resources. In at least some instances, a customer will want to launch new virtual machines or applications within the cloud environment. It will often be the case, however, that the software or machine images will not be scanned for vulnerability before being available in the environment. While conventional approaches utilize periodic scans, the software or machine images may be vulnerable until such a scan occurs or until an undesirable result occurs as a result of the vulnerability. Unfortunately, at the present time there is no real mechanism for scanning a virtual machine or application before being available in the environment.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing aspects of multi-tenant resources in an electronic environment. In particular, various embodiments provide for the launching of a virtual machine, application, or other such object in a first network configuration, whereby one or more scans can be performed. These can include various vulnerability scans or other such scans, as may be dictated by one or more policies. If any and all scans are successful, the virtual machine, application, or other object can be allowed to operate in a second network configuration. This can include, for example, changing a network state, launching a new instance in a second network, or other such action. If a similar request is subsequently received, that request may be passed along without scanning as long as the type of request is "blessed," or otherwise whitelisted for launching without required scanning. The scanning process can be part of a launch pipeline or workflow that can be dictated by one or more policies provided by one or more entities, such as an owner of the resource environment, the owner of a virtual cloud within (or outside) that environment, a customer requesting to launch the instance, or another such entity. Such approaches enable a provider, administrator, or other such entity to define what "secure" means with respect to a network, sub-network, resource, or other such component.

Various other applications, processes, and uses are presented below with respect to the various embodiments.

Figure 1:
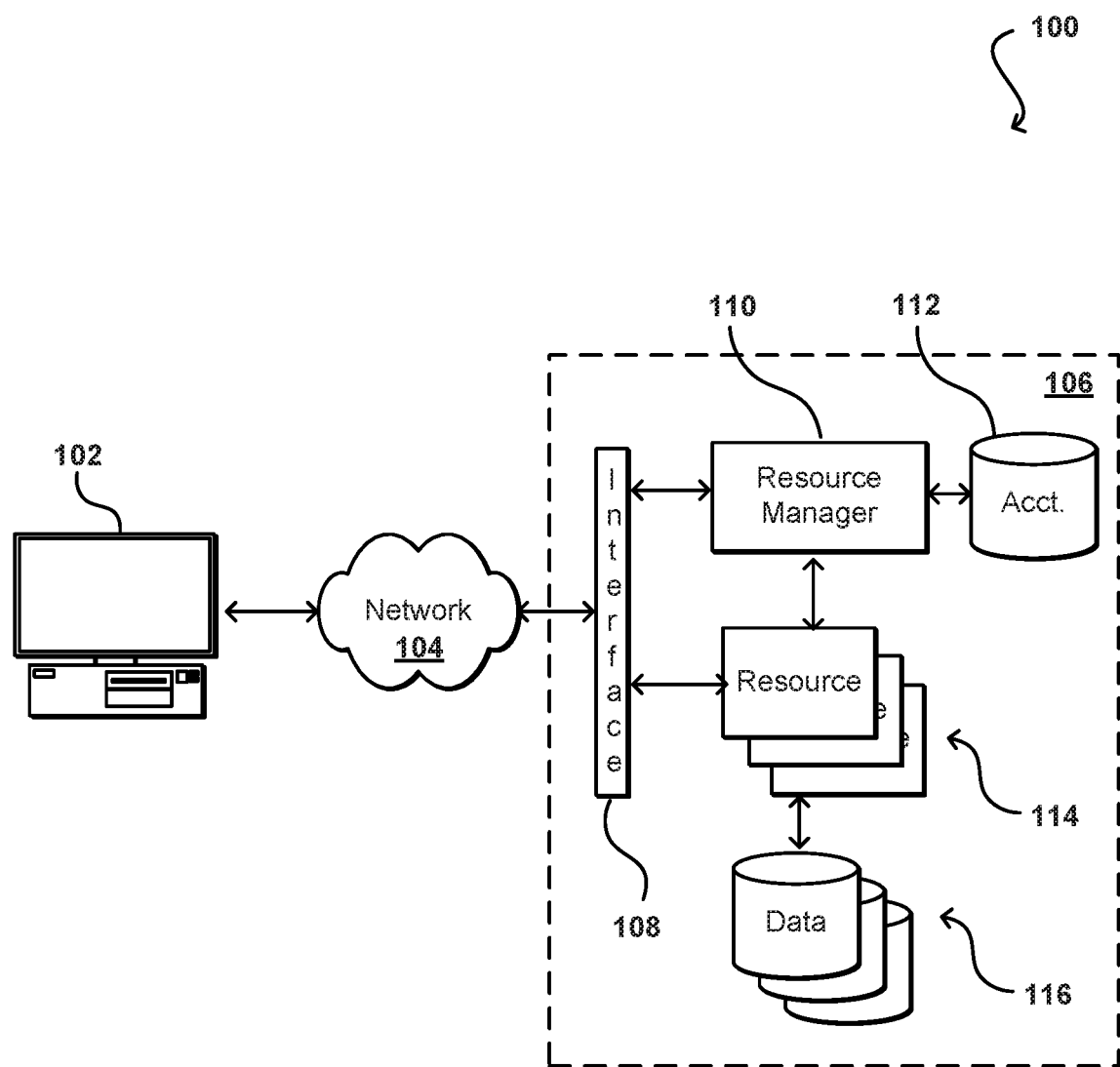
FIG. 1 illustrates an example environment in which various embodiments can be implemented.

FIG. 1 illustrates an example environment 100 in which aspects of the various embodiments can be implemented. In this example a customer of a multi-tenant environment 106 is able to utilize a client device 102 to submit requests across at least one network 104 to at least one designated address or interface of the multi-tenant and/or resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The multi-tenant environment 106 can be supported and/or offered by a resource provider, and can include any appropriate components for receiving requests and returning information or performing actions in response to those requests. As an example, the environment might include Web servers and/or application servers for receiving and processing requests, then returning data, Web pages, video, audio, or other such content or information in response to the request. In many cases, the customer will have an account with the provider of the multi-tenant environment that indicates which resources or types of resources the customer can access, an amount of that access, types of tasks that can be performed with that access, or other such terms. One or more users might be associated with the customer, and thus can be able to access the resources per the customer account.

In various embodiments, the environment 106 may include various types of resources that can be utilized by multiple users for a variety of different purposes. In at least some embodiments, all or a portion of a given resource or set of resources might be allocated to a particular customer or allocated for a particular task, for at least a determined period of time. The sharing of these resources from a multi-tenant environment is often referred to as resource sharing, Web services, or "cloud computing," among other such terms and depending upon the specific environment and/or implementation. In this example the multi-tenant environment includes a plurality of resources 114 of one or more types. These types can include, for example, application servers operable to process instructions provided by a user or database servers operable to process data stored in one or more data stores 116 in response to a user request. As known for such purposes, the customer can also reserve at least a portion of the data storage in a given data store. Methods for enabling a customer to reserve various resources and resource instances are well known in the art, such that detailed description of the entire process, and explanation of all possible components, will not be discussed in detail herein.

In at least some embodiments, a user wanting to utilize at least a portion of the resources 114 can submit a request that is received to an interface layer 108 of the multi-tenant environment 106. The interface layer can include application programming interfaces (APIs) or other exposed interfaces enabling a user to submit requests to the multi-tenant environment. The interface layer 108 in this example can also include other components as well, such as at least one Web server, routing components, load balancers, and the like. When a request to provision a resource is received to the interface layer 108, for example, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account, or is associated with a customer having an existing account, with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user is not associated with a valid account with the provider, an associated account does not enable access to the type of resources specified in the request, or another such reason is preventing the user from obtaining access to such resources, a communication can be sent to the user (or associated customer) to enable the user to create or modify an account, or change the resources specified in the request, among other such options.

Once the user and/or request is authenticated, the account verified, and the resources allocated, the user can utilize the allocated resource(s) for the specified capacity, amount of data transfer, period of time, or other such metric. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, however, certain customers might want more assurance that requests received to the interface layer 108 of the multi-tenant environment 106 are properly authenticated such that valid requests for resources under a customer account are allowed, and modified or invalid requests purporting to be associated with the customer are rejected. For example, if a third party is able to obtain a copy of the credentials, such as a secure token, the third party can potentially generate requests that include those credentials and can obtain access to the resources associated with the customer account. Various other types of unauthorized or malicious requests can be received to the multi-tenant environment as well.

As mentioned, a customer of such an environment might want to perform any of a number of tasks, such as may include launching virtual machines from new machine images or launching applications using new or updated code, among other such tasks. In the example situation 200 of FIG. 2, a customer has submitted a request through an appropriate API 212 of the interface layer 108 to have a virtual machine instance 204 launched on a resource 202, such as a server or host machine, of the provider environment 106. It should be noted that reference numbers for similar items are carried over between figures for simplicity of explanation but that such usage should not be interpreted as a limitation on the scope of the various embodiments. In this example, the virtual machine 204 would exist within the resource provider environment 206, and thus could potentially communicate with other processes, applications, and components in (and outside) that environment. Due to the presence of the virtual machine (VM) 204 in the environment, the VM will potentially be vulnerable to attacks or other undesired behavior that could cause problems for the VM and/or a provider of the VM, among other such possibilities.

Accordingly, approaches in accordance with various embodiments can attempt to launch the virtual machine instance in the network but with a first configuration, state, or set of permissions, which will enable one or more scans to be run against the instance before providing full access and/or final configuration or permissions in the target network. The scan(s) to be performed can depend on a variety of factors, such as may be dictated by one or more rules or policies, and a certain type of result of the scan(s) may need to be obtained before full access to the network in the second configuration can be granted.

Figure 2:
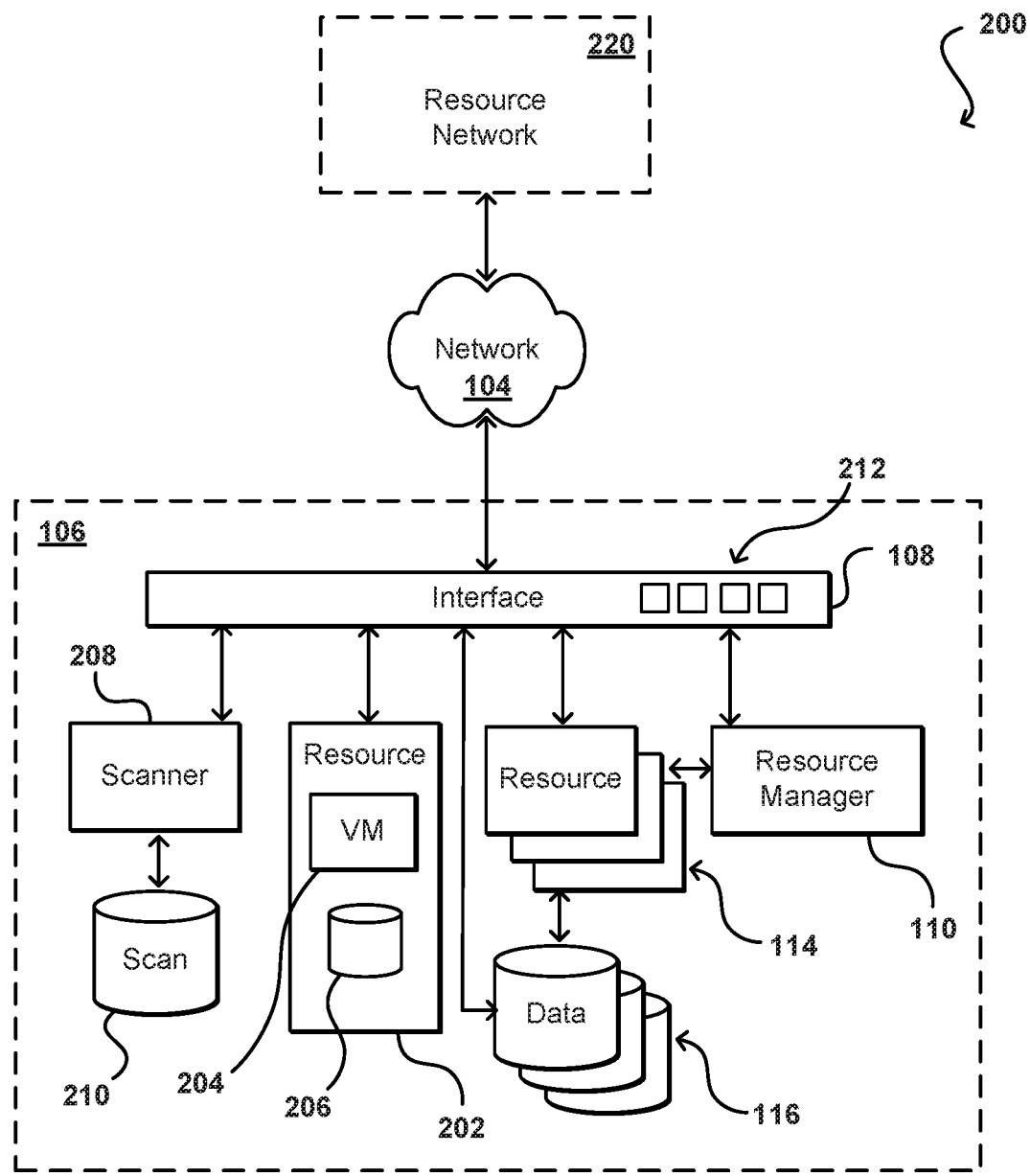
FIG. 2 illustrates an example configuration wherein a scanning component is available to scan virtual machines and other components in a first network configuration before being available in a second network configuration that can be utilized in accordance with various embodiments.

For example, in the situation 200 of FIG. 2 a customer can request to launch a virtual machine instance in the provider environment 106. Accordingly, a virtual machine 204 can be launched on a determined host machine or other such resource 202. The virtual machine can be launched with a data store 206, a virtual machine manager (VMM—not shown), and/or any other appropriate components or resources. In this example, the host machine 202 (or a subset of the resources in the environment) might have certain permissions or configurations that limit access to or from the virtual machine 204. For example, the VM 204 might not be able to communicate with certain other resources 114 or data stores 116 in the environment, communicate with external networks 220, or perform other such tasks while the operating in the first network configuration.

In one example, the request to launch an instance can kick off a workflow that will manage the scanning. This can be managed by the resource manager 110 or another appropriate component, system, or service. In this example, the virtual machine 204 is launched on a determined resource 202, such as a server or host machine, along with any necessary components. The workflow can cause the instance to be launched in a first network configuration, first network sub-environment, or in another restricted environment such that the virtual machine can be available for scanning but protected from various vulnerabilities that might otherwise be present if launched in the full target network and/or with full access and privileges, etc. After the virtual machine is available in the first network configuration, a scanner 208, scanning subsystem, or other such component can cause one or more scans to be performed against the virtual machine 204. The scanning subsystem can include, for example, one or more machines, real or virtual, configured to execute code for performing one or more types of scans on various electronic resources, such as virtual instances or virtual machines. The scanning subsystem can include, or have access to, one or more libraries or other sources of data for use in running the scans, such as libraries of virus or malware data and the like. The scans performed can include, for example, scans for security vulnerabilities, viruses, malware, data loss prevention actions, interoperability, integration capability, available functionality, performance, and the like. The scans can each be determined to succeed or fail in some cases, while in other cases the results might include information about potential risks or other such discoveries. If one or more of the scans comes back with an unfavorable result, a number of different actions might be taken. These can include, for example, deleting the virtual machine, notifying the customer associated with the VM, leaving the VM in the first network environment so changes can be made, providing information to an administrator for analysis, etc. If the scans come back successful, clean, or otherwise favorable, the VM can be caused to operate in the second network configuration. This can include, for example, adjusting the permissions, access, or configuration of the host machine 202 running the VM, or deleting that instance of the VM and launching a new instance of the VM on another resource 114 in the environment that has full access, among other such options. A successful scan in some embodiments might include a scan that does not detect any vulnerabilities or viruses, and also matches expected results based upon results of previous scans for similar VMs, as may be stored in a scan data store 210 or other such location.

In some embodiments, a scan can be triggered instead by analyzing a request received from the virtual machine 204. For example, the VM once executing on the host machine 202 may submit a request that will be received by an API 212 of the interface layer 108 or another appropriate interface. A component of the interface can analyze the request to determine if the request indicates that the sending VM was scanned, such as by including a tag or other security credential. If the request contains the tag, for example, the request can be forwarded to the appropriate destination or otherwise handled as a typical request. If the request does not include the security tag or other such credential, however, a scan can be triggered using the scanner 208 or another such component, system, or service. The scan can include scans of the request, packets from the VM, the VM itself, and/or other such scans. If the scan is successful, the request can be forwarded with the appropriate security information and/or the VM (or data for the VM) can be modified such that subsequent requests will be tagged with the appropriate security information and the VM can operate fully in the second network configuration.

Figure 3:
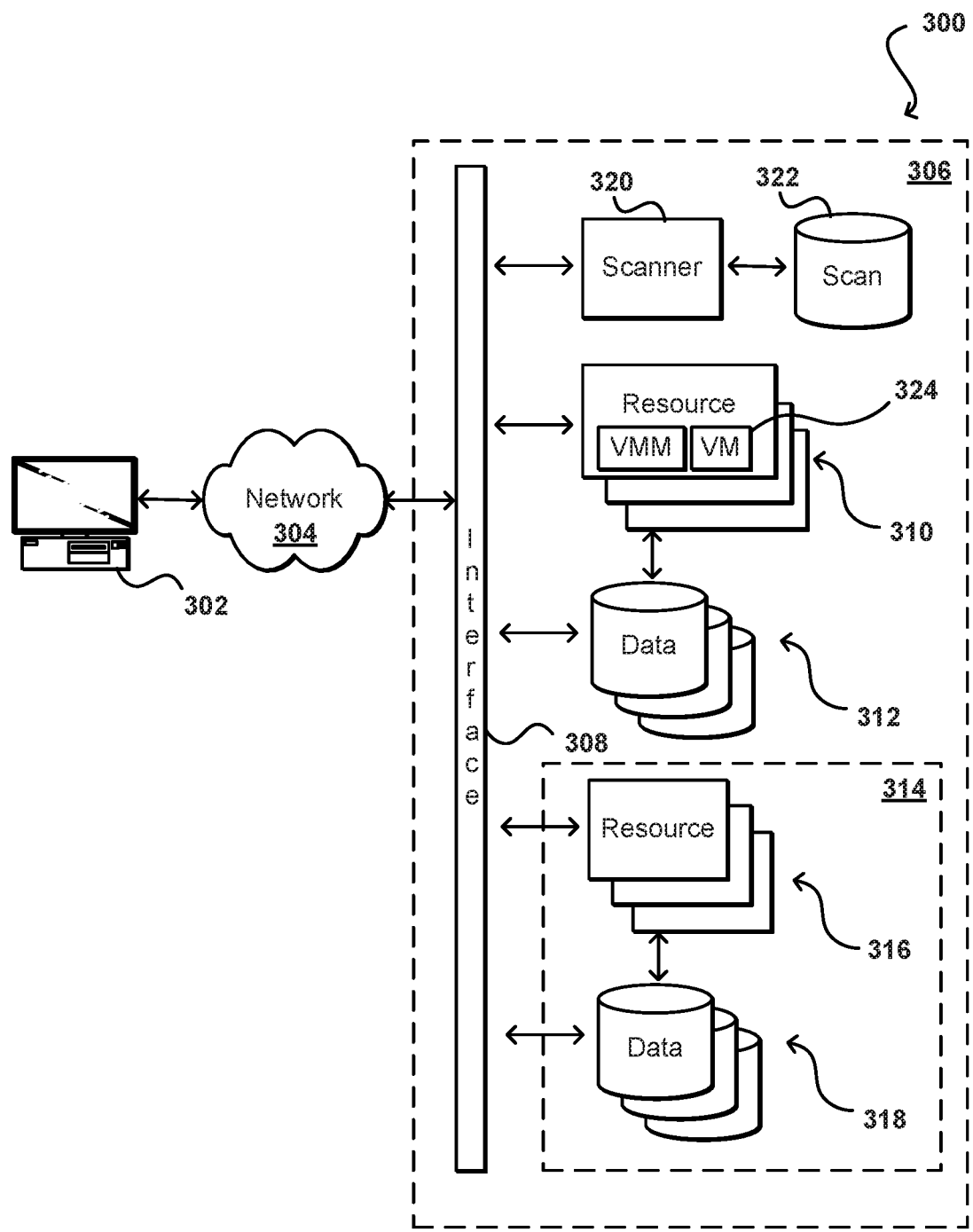
FIG. 3 illustrates an example configuration wherein a scanning component is available to scan virtual machines before being available to a virtual private cloud that can be utilized in accordance with various embodiments.

In some embodiments, a virtual machine might be launched into an environment, but restricted from accessing a portion of that environment until one or more scans are performed. For example, in the situation 300 of FIG. 3 a VM 324 is launched on a resource 310 in a first portion of a resource environment 306, where the first portion can include existing infrastructure (e.g., servers, data stores, and networking components) for executing the VM and related functionality. The VM 324 might be able to communicate, through the interface layer 308 or otherwise, with a client device 302 over a network 304, other resources 310 in the environment 306, data stores 312, and the like. It might be the case, however, that a second portion of the network, such as a sub-network 314, virtual private cloud (VPC), or other subset of resources in the environment requires one or more scans to be performed by an instance before that instance is able to obtain access to, or communicate with, resources in the sub-network. For example, a customer having ownership over the resources of the sub-network 314 might set a policy that a VM 324 or other such component must pass at least one specified scan before being able to interact with resources 316, data stores 318, and/or other such components of the sub-network of the resource environment 306.

For example, a request received by the interface layer 308 can be analyzed before being delivered to the sub-network, whereby the policy can be performed and the scan performed as discussed previously. In some embodiments, the customer associated with the VM 324 or the provider of the environment 306 might be able to establish such a policy as well, whereby resources of and/or outside the sub-network must pass scans before communication or access across a sub-network boundary, among other such options.

Because such environments can be highly dynamic, it can be beneficial to apply such rules or policies at various levels or locations in the environments. These can include, for example, policies for new code to be executed, virtual machine instances to be launched, virtual private clouds to be established, security groups provisioned, and the like. In some embodiments the communication channels are configured such that communication is only allowed with a scanner or security validation component, for example, until such time as a scan is executed and the result determined to pass one or more security criteria. After passing the scan, communication and access can be configured as appropriate for the situation. Further, while many of the examples discussed herein show the scanning as part of the environment including the resources, it should be understood that the scanning and other related aspects could be provided as a third party service or other such option, whereby a resource, customer, environment provider, or other such entity can request one or more scans to be performed and the results returned before performing one or more actions, such as to enable a resource to have full access to an environment. In some embodiments such scans can be obtained through an electronic marketplace from one or more third party vendors offering such services. As mentioned, such scans can be used to determine whether or not to provide access (as well as a level of access to provide) for physical and/or virtualized network infrastructure and other such components.

As mentioned, in some embodiments a launch pipeline can be used to launch new applications, virtual machines, etc. The launch pipeline can cause the launch to occur in a first network configuration where communication may be limited to the scanning fleet and blocked with respect to other portions of the network (i.e., VPCs) or other networks, such as the Internet. The launch can then be scanned as appropriate. Based at least in part upon the result of the scan, the launch can be caused to occur in a second network configuration or otherwise granted the requested (or other appropriate level of) access. The scanning process can be configured at the level of the instance, as a policy with respect to the ability to launch instances, or an attribute of the network to which someone wants to connect the instance, among other such options. For example, an administrator of a production sub-network can specify that, before anything can connect to the sub-network, it must first be launched in a specified alternate configuration that is subject to the scan(s) indicated for the sub-network. In some embodiments the scans are conventional scans, where packets are sent to the instance and the returned packets analyzed, which can include performing certain tasks. In some embodiments the scans might be done from a hypervisor within the host machine or other infrastructure to introspect the state of the VM to determine the running software, directly examine the attached storage, determine the software installed, etc. In some embodiments a policy can be defined on a data store, database, data cluster, or other resource (or set of resources) from which data be obtained and/or data operations performed. In such an instance, any instance attempting to connect to the specified resource(s) may have to undergo and "pass" a scan in order to be able to connect to the resource(s). As mentioned, "passing" a scan can have different meanings in different contexts. For example, an antivirus scan might only be considered to pass if nothing suspicious is detected, while in other contexts the antivirus scan might be considered to pass as long as no major threats are detected (allowing for very small risks in certain situation). Various other results can be obtained as well, and the various results associated with pass, fail, or other determinations, such as where limited access might be granted or another process required before the full level of requested access is provided. In some embodiments only certain software (e.g., end user supplied software) may need to be scanned instead of the entire virtual machine. In some embodiments open ports and other components may be examined to determine software versions and other such information. In some embodiments various policies can potentially apply, with each policy potentially triggering one or more scans from a library of scanning modules. The scanners themselves can be virtual machines that are launched for purposes of scanning and then killed after the scan is complete. In some embodiments the scanners are part of an integration network to which an instance has to connect, to determine integration with other components, before the instance is allowed to connect to a production network. Various other approaches can be utilized as well within the scope of the various embodiments.

Figure 4:
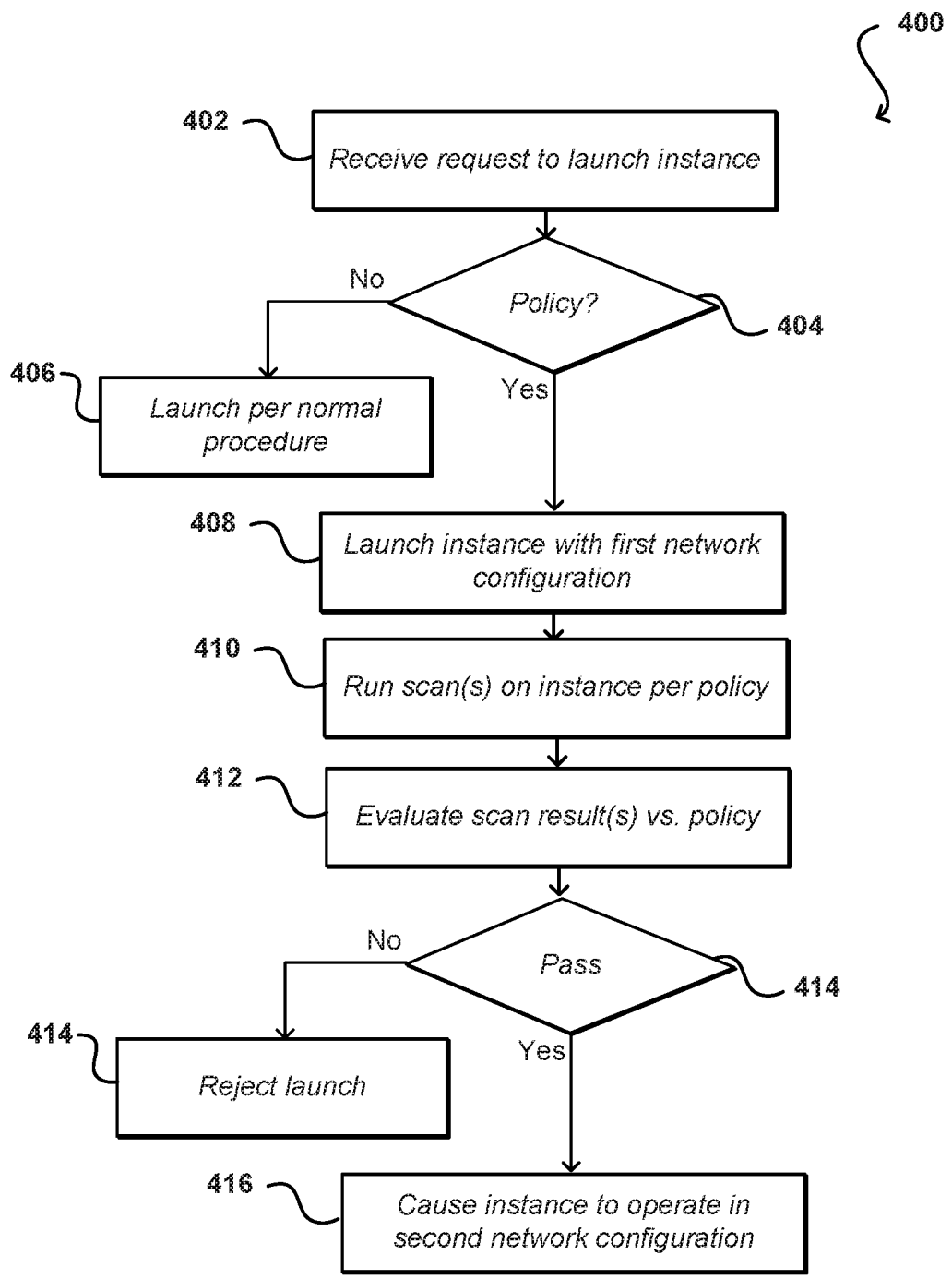
FIG. 4 illustrates an process for scanning an instance in a first network configuration before making available in a second network configuration that can be utilized in accordance with various embodiments.

FIG. 4 illustrates an example process 400 for determining whether to perform one or more scans for a virtual machine (or other such component, system, or network) before enabling that VM to obtain a specific level of access to a network, sub-network, resource, or other such component, system, or service in an electronic environment. It should be understood that, for any process discussed herein, there can be additional, fewer, or alternative steps, performed in similar or different orders, or in parallel, within the scope of the various embodiments unless otherwise stated. In this example, a request to launch an instance of a virtual machine is received 402, where that instance will have access to at least one specified resource, network, sub-network, etc. In this example, the instance will be launched within a multi-tenant environment offered by a provider, and the at least one specified resource can be owned or administered by the provider, the owner of the instance to be launched, or a third party customer, among other such options. In some embodiments, the instance might already be running but wants to change the way the instance operates in the environment, such as the way it communicates, resources it accesses, etc.

A determination can be made 404 as to whether one or more policies apply to the launch. This can include, for example, a policy for any instance to be launched in the network or environment, a policy for a resource to which the instance will want to connect, a policy for the administrator or owner of the instance to be launched, or another such component or entity. As mentioned, the policy could also be related to a launch workflow or pipeline, among other such options. If there is no relevant policy (or other rule, etc.) regarding the launch, the instance can be launched 406 per normal procedure in the environment. It should be noted that there can be other policies, rules, authorizations, and requirements for launching an instance in an environment that could be unrelated to security scans and other functions discussed and suggested herein, which may need to be performed independent of the process currently under discussion. If one or more policies are determined to apply, the instance can be launched 408 with a first network configuration. As discussed, this could include launching the instance in a scanning environment, launching the instance with limited access in a production environment, launching the instance under a first network configuration, and the like. Per the one or more applicable policies, one or more scans can be run 410 against the instance, where the scans can include scans such as security scans, performance scans, and various others as discussed herein. The results of the scans then can be evaluated 412 against the relevant polices. This can include, for example, determining ranges or types of results that can be considered as a pass or fail, for example, while some policies can dictate certain actions be taken for other types of results. In this example, if one or more of the scans is determined 414 not to pass, the launch can be rejected. As discussed, however, in other examples other actions might be taken, such as notifying an administrator or launching with limited functionality, etc. If all scans of the instance are determined to pass, the instance can be caused 416 to operate in a second network configuration. As discussed, this can include launching a new instance of the virtual machine in a production network, mutating the existing network environment, changing configuration information, and other such options.

Figure 5:
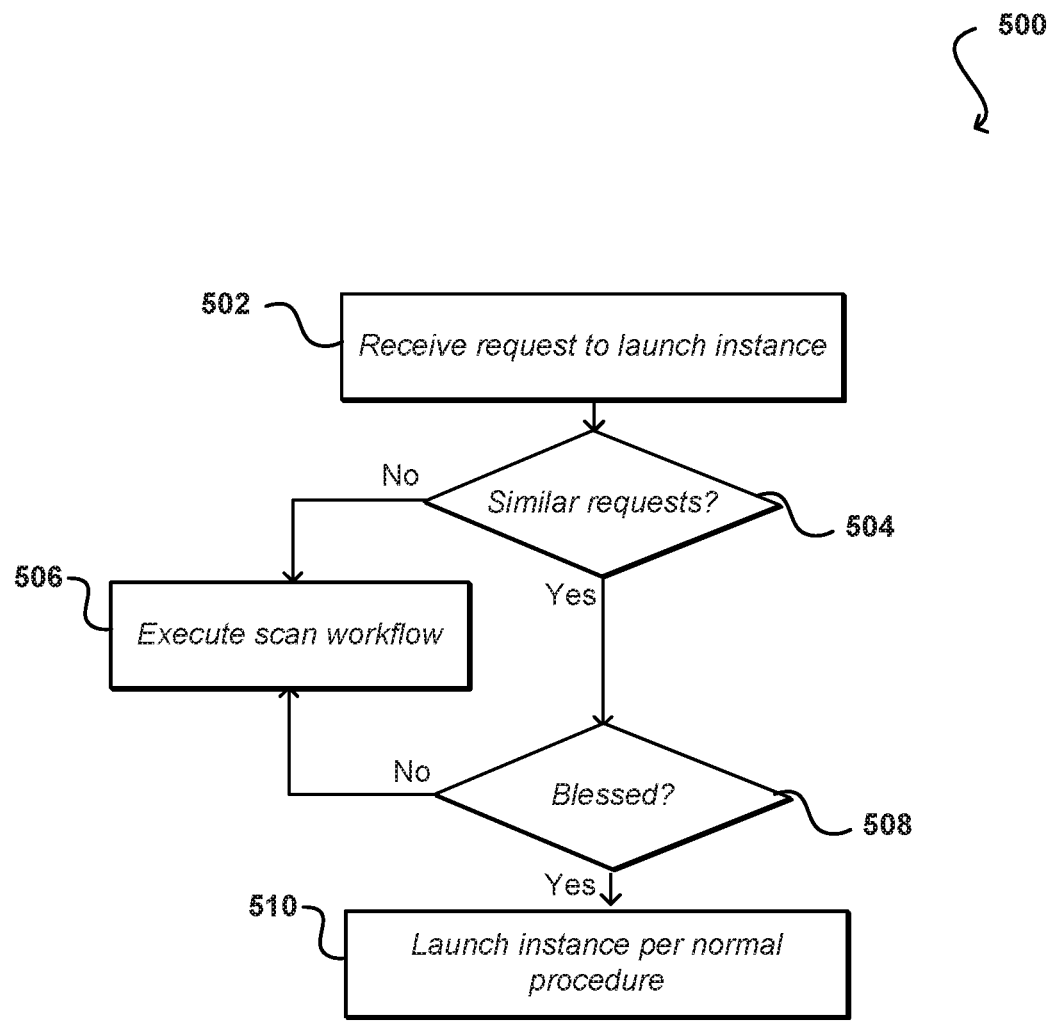
FIG. 5 illustrates an example process for determining not to scan requests that are similar to other blessed requests that can be utilized in accordance with various embodiments.

It might be the case that one or more policies might be applicable, but a scan not required for a particular instance. As an example, FIG. 5 illustrates a process 500 wherein a request to launch an instance of a virtual machine in a resource environment is received. As mentioned above, there may be rules or policies indicating that one or more scans may need to be performed for such a launch. A determination can be made 504 as to whether similar requests have been received. This can include, for example, previous requests to launch instances from the same virtual machine image received from the same source. If no similar requests have been received, or the similar requests do not satisfy one or more similarity criteria, a scan flow can be executed 506 such as is discussed with respect to FIG. 4, whereby the instance must pass one or more scans before being launched in the production environment. If, however, a sufficient number of sufficiently similar requests have been received, a determination can be made 508 as to whether the type of request has been approved or "blessed" for launching without additional scanning. For example, a certain type of instance might be launched frequently, and it might be undesirable to have to scan each instance when the results of the scan are consistently the same. This might change based upon changes in network conditions, etc., which might cause the type of instance to be scanned and re-blessed. If the type of request or instance is not blessed, the scan workflow can be executed as discussed. If blessed, however, the instance can be launched 510 as requested, pending other criteria for launching in the environment.

Figure 6:
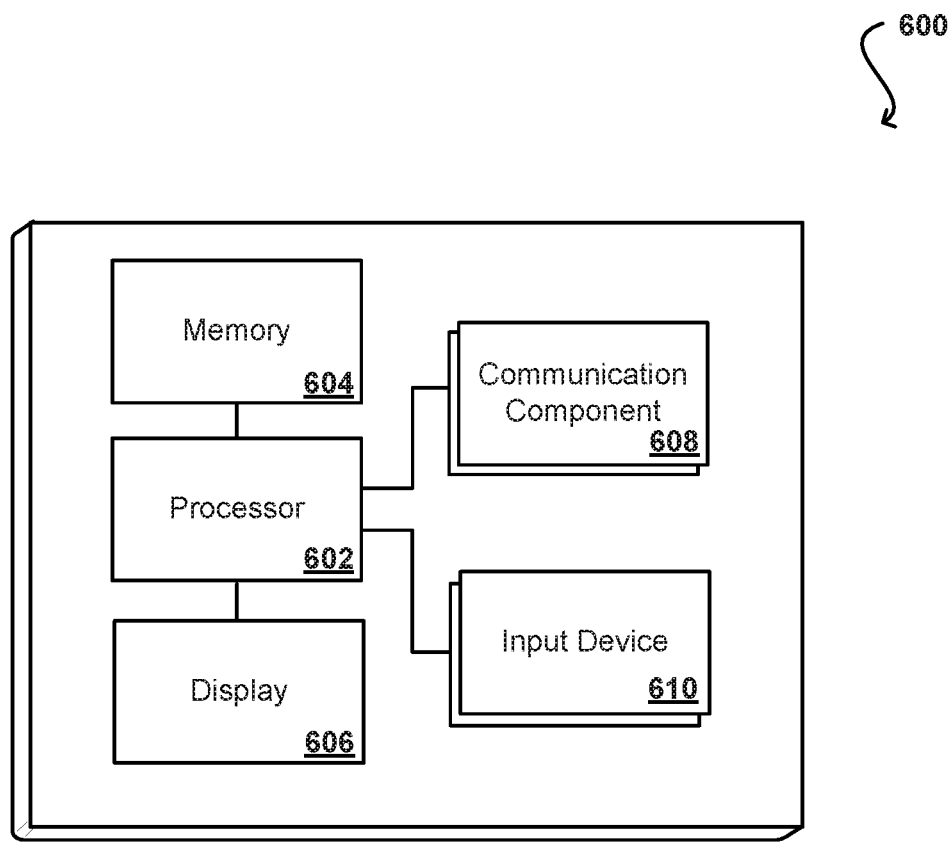
FIG. 6 illustrates a set of components of an example computing device that can be used to implement aspects of the various embodiments.

FIG. 6 illustrates a set of basic components of an example computing device 800 that can be utilized to implement aspects of the various embodiments. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the at least one processor 602, the same or separate storage can be used for images or data, a removable memory can be available for sharing information with other devices, and any number of communication approaches can be available for sharing with other devices. The device may include at least one type of display element 606, such as a touch screen, electronic ink (e-ink), organic light emitting diode (OLED) or liquid crystal display (LCD), although devices such as servers might convey information via other means, such as through a system of lights and data transmissions. The device typically will include one or more networking components 608, such as a port, network interface card, or wireless transceiver that enables communication over at least one network. The device can include at least one input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
determining that a policy associated with a virtual machine (VM) does not require scanning of the VM prior to launching;
causing a scanning VM to perform the scan on packets generated by the VM, wherein the scanning VM and the VM are hosted within a multi-tenant environment;
evaluating a result of the scan against the policy;
determining that the result of the scan complies with at least one scan requirement of the policy; and
enabling modifications to security of the VM for communicating subsequent packets from the VM to one or more resources in the multi-tenant environment.

2. The computer-implemented method of claim 1, further comprising:
receiving individual ones of the packets at the scanning VM;
analyzing the individual ones of the packets using one or more tasks defined in the scanning VM; and
providing the result of the scan.

3. The computer-implemented method of claim 1, further comprising:
receiving information for the policy from at least one of a provider of the multi-tenant environment, an administrator of the one or more resources, or a source of a request to launch the VM; and
storing the policy for use in processing subsequently-received launch requests.

4. The computer-implemented method of claim 3, further comprising:
providing an application programming interface (API) enabling the policy to be specified for the subsequently-received launch requests, the API associated with the one or more resources.

5. A system, comprising:
at least one device processor; and
memory including instructions that, when executed by the at least one device processor, cause the system to:
determine that a policy associated with a virtual machine (VM) does not require scanning of the VM prior to launching;
cause a scanning VM to perform the scan on packets generated by the VM, wherein the scanning VM and the VM are hosted within a multi-tenant environment;
evaluate a result of the scan against the policy;
determine that the result of the scan complies with at least one scan requirement of the policy; and
enable modifications to security of the VM for communicating subsequent packets from the VM to one or more resources in the multi-tenant environment.

6. The system of claim 5, wherein the instruction when executed further cause the system to:
receive individual ones of the packets at the scanning VM;
analyze the individual ones of the packets using one or more tasks defined in the scanning VM; and
provide the result of the scan.

7. The system of claim 5, wherein the VM is a first instance of the VM in a sub-network of the resource environment.

8. The system of claim 7, wherein the instructions when executed further cause the system to:
terminate the first instance; and
launch a second instance of the VM in the resource environment.

9. The system of claim 5, wherein the VM includes at least one of a host server, a sub-network, a virtual private cloud, or a customer network.

10. The system of claim 5, wherein the instruction when executed further cause the system to:
determine whether a request associated with the VM includes a security credential before determining that the VM does not require the scanning of the VM prior to the launching, the security credential indicating that the scanning had been performed previously for the VM and would not need to be performed for the request.

11. The system of claim 5, wherein the instruction when executed further cause the system to:
determine that the result satisfies the at least one connection criteria defined in the policy.

12. The system of claim 5, wherein the instruction when executed further cause the system to:
determine, from an electronic marketplace, a service offering the scanning, wherein information for the scanning and the VM are available to the service.

13. The system of claim 5, wherein the scanning includes at least one of security vulnerability scan, a virus scan, a malware scan, a data loss prevention scan, an interoperability scan, an integration capability scan, an available functionality scan, or a performance scan.

14. The system of claim 5, wherein the scanning is performed by a hypervisor within a host machine that hosts the VM.

15. The system of claim 5, wherein existing infrastructure in the multi-tenant environment is configured to provide one or more execution services for the VM.

16. A non-transitory computer-readable storage medium including instructions that, when executed by at least one processor of a computer system, cause the computer system to:

determine that a policy associated with a virtual machine (VM) does not require scanning of the VM prior to launching;

cause a scanning VM to perform the scan on packets generated by the VM, wherein the scanning VM and the VM are hosted within a multi-tenant environment;

evaluate a result of the scan against the policy;

determine that the result of the scan complies with at least one scan requirement of the policy; and enable modifications to security of the VM for communicating subsequent packets from the VM to one or more resources in the multi-tenant environment.

17. The non-transitory computer-readable storage medium of claim 16, wherein the instructions when executed further cause the computer system to:

receive individual ones of the packets at the scanning VM;

analyze the individual ones of the packets using one or more tasks defined in the scanning VM; and provide the result of the scan.

18. The non-transitory computer-readable storage medium of claim 16, wherein the instructions when executed further cause the computer system to:

determine, from an electronic marketplace, a service offering the scanning, wherein information for the scanning and the VM are available to the service.

19. The non-transitory computer-readable storage medium of claim 16, wherein the instructions when executed further cause the computer system to:

determine that the result satisfies the at least one connection criteria defined in the policy.

20. The non-transitory computer-readable storage medium of claim 16, wherein the instructions when executed further cause the computer system to:

determine whether a request associated with the VM includes a security credential before determining that the VM does not require the scanning of the VM prior to the launching, the security credential indicating that the scanning had been performed previously for the VM and would not need to be performed for the request.

* * * * *